(12) United States Patent
Jiang et al.

(10) Patent No.: US 9,193,816 B2
(45) Date of Patent: Nov. 24, 2015

(54) INFRARED LIGHT- AND THERMAL-RESPONSIVE GRAPHENE OXIDE HYDROGEL POLYMER COMPOSITES

(75) Inventors: Hongrui Jiang, Madison, WI (US); Chi-Wei Lo, San Jose, CA (US); Difeng Zhu, Boise, ID (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 963 days.

(21) Appl. No.: 13/307,572

(22) Filed: Nov. 30, 2011

(65) Prior Publication Data

US 2013/0137054 A1 May 30, 2013

(51) Int. Cl.
| | |
|---|---|
| C08F 220/54 | (2006.01) |
| C08F 292/00 | (2006.01) |
| C08L 51/10 | (2006.01) |
| G02B 3/14 | (2006.01) |
| C08F 220/32 | (2006.01) |

(52) U.S. Cl.
CPC ............. *C08F 220/54* (2013.01); *C08F 292/00* (2013.01); *C08L 51/10* (2013.01); *C08F 2220/325* (2013.01); *G02B 3/14* (2013.01); *Y10T 137/0318* (2015.04); *Y10T 137/1624* (2015.04)

(58) Field of Classification Search
None
See application file for complete search history.

(56) References Cited

U.S. PATENT DOCUMENTS

2014/0105242 A1   4/2014   Fernandes et al.

OTHER PUBLICATIONS

Sun et al., A one-step strategy for thermal- and pH-responsive graphene oxide interpenetrating polymer hydrogel networks, Journal of Materials Chemistry, vol. 21, Feb. 22, 2011, pp. 4095-4097.*
Bai et al., Chem. Commun., 2010, 46, 2376-2378.*
Zhu et al., Focus-Tunable Microlens Arrays Fabricated on Spherical Surfaces, Journal of Microelectromechanical Systems, vol. 20, No. 2, Apr. 2011, pp. 389-395.
Zhu et al., Tunable-focus microlens arrays on curved surfaces, Applied Physics Letters, vol. 96, No. 081111, Feb. 25, 2010, pp. 1-3.
Mohamed et al., Hot electron and phonon dynamics of gold nanoparticles embedded in a gel matrix, Chemical Physics Letters, vol. 343, Jul. 27, 2001, pp. 55-63.
Alzari et al., Graphene-containing thermoresponsive nanocomposite hydrogels of poly(N-isopropylacrylamide) prepared by frontal polymerization, Journal of Materials Chemistry, vol. 21, May 10, 2011, pp. 8727-8733.
Alzari et al., Stimuli-Responsive Polymer Hydrogels Containing Partially Exfoliated Graphite, Journal of Polymer Science: Part A: Polymer Chemistry, vol. 48, Oct. 1, 2010, pp. 5375-5381.
Scognamillo et al., Thermoresponsive Super Water Absorbent Hydrogels Prepared by Frontal Polymerization of N-Isopropyl Acrylamide and 3-Sulfopropyl Acrylate Potassium Salt, Journal of Polymer Science Part A: Polymer Chemistry, vol. 49, Jan. 10, 2011, pp. 1228-1234.
Lo et al., An infrared-light responsive graphene-oxide incorporated poly(N-isopropylacrylamide) hydrogel nanocomposite, Soft Matter, vol. 7, May 10, 2011, pp. 5604-5609.

(Continued)

*Primary Examiner* — Satya Sastri
(74) *Attorney, Agent, or Firm* — Bell & Manning LLC

(57) ABSTRACT

Composite hydrogels and methods for making and using the composite hydrogels are provided. The composite hydrogels comprise graphene oxide flakes distributed in, and covalently bonded to, a thermo-responsive hydrogel polymer.

19 Claims, 11 Drawing Sheets

(56) References Cited

OTHER PUBLICATIONS

Lo et al., Microfluidic Actuators Based on Infrared-Light Responsive PNIPAAM Hydrogel Nanocomposite Incorporating Graphene-Oxide, 2011 16th International Solid-State Sensors, Actuators and Microsystems Conference (Transducers), Beijing, China, Jun. 5-9, 2011, pp. 2430-2433.

Lo et al, "Microfluidic Actuators Based on Infrared-Light Responsive PNIPAAM Hydrogel Nanocomposite Incorporating Graphene-Oxide," Poster Presented at Transducers '11, The 16th International Conference on Solid-State Sensors, Actuators and Microsystems, Jun. 5-9, 2011.

* cited by examiner

INFRARED LIGHT- AND THERMAL-RESPONSIVE GRAPHENE OXIDE HYDROGEL POLYMER COMPOSITES

REFERENCE TO GOVERNMENT RIGHTS

This invention was made with government support under 0702095 and 0745000 awarded by the National Science Foundation. The government has certain rights in the invention.

BACKGROUND

Responsive hydrogels which have the capability to respond to external stimuli, such as temperature, pH, photons, and antigens, have attracted attention because such hydrogels can serve as functional materials with potential applications in the areas of drug/gene delivery, microlenses and sensors. Light-responsive hydrogels are promising because the activation process via light can be remote and noninvasive. For example, thermo-responsive poly(N-isopropylacrylamide) (PNIPAAm) hydrogels have been shown to possess light responsiveness for microfluidic applications when incorporating gold nanoparticles (AuNPs). The light response is realized by combining the reversible hydration-dehydration transition of NIPAAm and the plasmonic absorption band in the near-infrared (IR) region of AuNPs. However, the volumetric change for the AuNP-containing hydrogel does not seem to be significantly more than that of the conventional responsive PNIPAAm hydrogel, thus limiting the potential applications for the material as an actuator.

SUMMARY

Composite hydrogels comprising graphene oxide flakes dispersed in and covalently bonded to thermo-responsive hydrogel polymers are provided. In some embodiments, the swelling ratio for the composite hydrogel is at least 50% greater than the swelling ratio for the thermo-responsive hydrogel polymer in the absence of the graphene oxide flakes at a temperature below the lowest critical solution temperature. The graphene oxide flakes can be functionalized with reactive functionalities, such as (meth)acrylate functionalities, that react with the thermo-responsive hydrogel polymer to form covalent bonds.

Micromechanical devices incorporating the composite hydrogels as actuators are also provided. One such device is a microfluidic device comprising a flow channel having an internal surface that defines an internal diameter of the flow channel; and a valve comprising a composite hydro gel affixed to the internal surface of the flow channel, wherein, in a swollen state, the composite hydrogel has a volume sufficient to block fluid flow through the flow channel.

The microfluidic device can be operated by heating the composite hydrogel valve while it is in the swollen state to a temperature sufficient to shrink the volume of the composite hydrogel and permit fluid flow though the flow channel. The valve can be re-closed by allowing the composite hydrogel valve to cool and re-swell to a volume sufficient to block fluid flow through the flow channel.

Lens structures comprising composite hydrogels as ring actuators are also provided. One such lens structure comprises a fluid cavity; a fluid housed within the fluid cavity, the fluid forming a meniscus configured to act as a lens; and a ring actuator comprising a composite hydrogel disposed around the fluid. When the composite hydrogel is in a swollen state the lens has a first focal length and when the composite hydrogel is in an unswollen state the lens has a second focal length that differs from the first focal length.

The lens structure can be operated by heating the composite hydrogel in the swollen state to a temperature sufficient to shrink the volume of the swollen composite hydrogel, thereby changing the focal length of the lens. The original focal length can be restored by allowing the composite hydrogel ring actuator to cool and re-swell.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
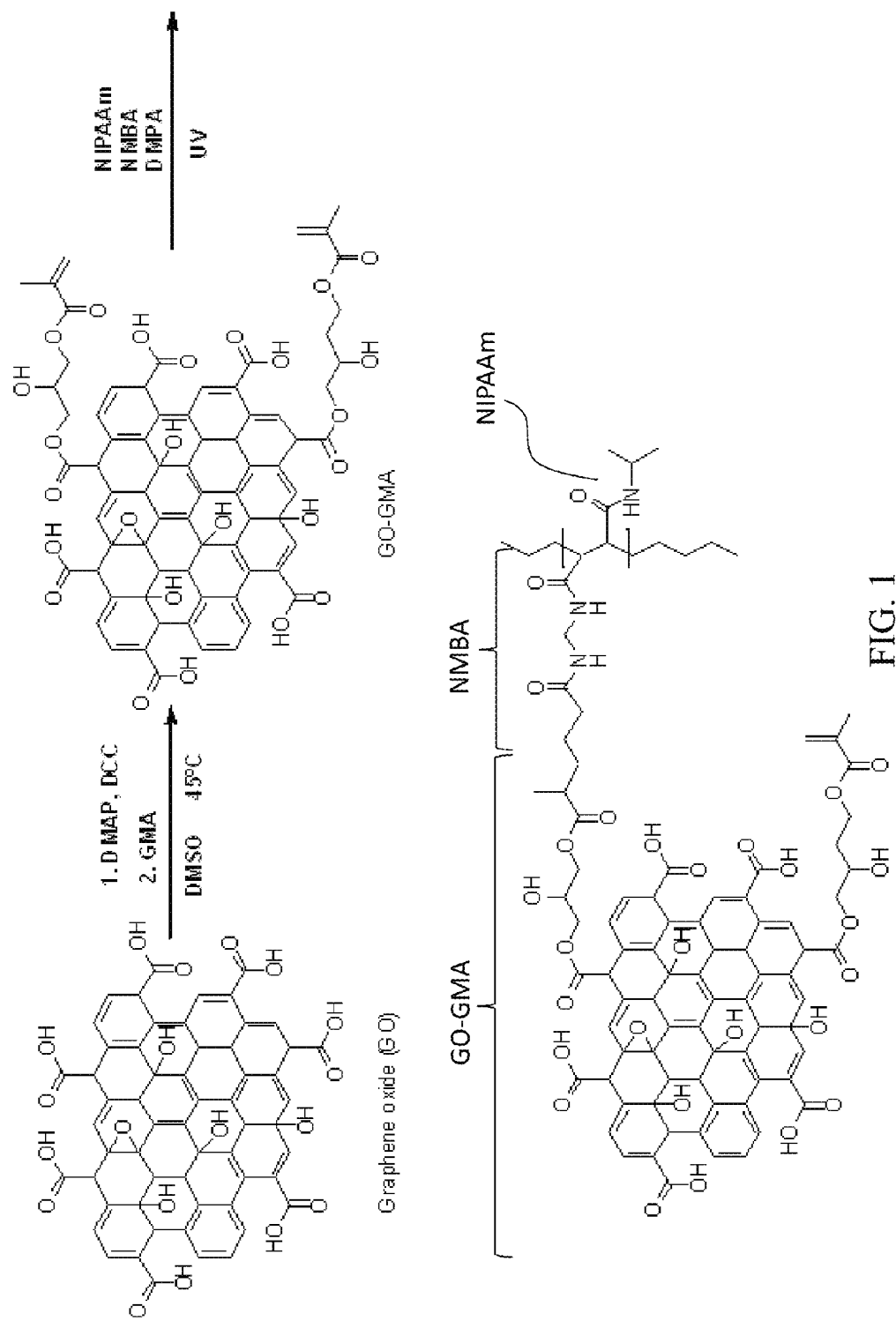
FIG. 1 shows a reaction scheme for the synthesis of a composite hydrogel comprising glycidyl methacrylate-functionalized graphene oxide in a PNIPAAm polymer hydrogel network.

Composite hydrogels and methods for making and using the composite hydrogels are provided. The composite hydrogels comprise graphene oxide flakes distributed in, and covalently bonded to, a thermo-responsive hydrogel polymer. The graphene oxide flakes have good thermal conductivity and high photothermal conversion capabilities for infrared radiation and, as such, can render the composite hydrogels infrared light-responsive. This is advantageous because it allows for remote activation of the composite hydrogels' hydration-dehydration transitions with an infrared light source. The composite hydrogels are characterized by swelling ratios that are larger than the swelling ratios of their hydrogel polymers in the absence of the graphene oxide flakes at temperatures below the LCST. This enhanced swelling ratio renders the composite hydrogels well-suited for use as actuators in micro- and nano-scale devices.

The composite hydrogels have an enhanced swelling ratio below the LCST and this enhancement becomes more pronounced as the temperature of the hydrogel decreases. For example, some embodiments of the composite hydrogels have a swelling ratio at 10° C. that is at least 50% greater than the swelling ratio of the hydrogel polymer from which the composite is made in the absence of the graphene flakes. This includes composite hydrogels having a swelling ratio at 10° C. that is at least 100% greater, at least 200% greater, and at least 250% greater than the swelling ratio of the hydrogel polymer from which the composite is made in the absence of the graphene flakes. In some embodiments, one or more of these enhancements can be achieved at a temperature of 20° C.

For the purposes of this disclosure, swelling ratio ($S_r$) is calculated via equation (1), as follows:

$$S_r = (W_w - W_d)/W_d \quad \text{Eq. (1)}$$

where $S_r$ is the equilibrium swelling ratio, $W_w$ and $W_d$ are the swollen weight of the hydrogel after equilibrium in deionized water and the dry weight of the hydrogel dried in vacuum for 12 hours, respectively. The swelling ratio is measured after incubating the hydrogel at a given temperature in deionized water for one hour to reach equilibrium.

Without intending to be bound to any particular theory behind the observed swelling ratio enhancement, it is believed that the graphene oxide flakes covalently bonded within the hydrogel polymer are able to form a less dense gel network than the hydrogel polymer forms in the absence of the flakes and, thus, provide extra volume for water uptake during the swelling of the hydrogel. This phenomenon may result from many immobile water molecules interacting with the graphene oxide structure. Within the composite hydrogel network, the graphene oxide sheets in the graphene oxide flakes can provide more interactions with water molecules, create more hydrogen bonding between the water molecules and the composite hydrogel network and, thus, hold more water than the hydrogel polymer alone. As a result, the composite hydrogels have high swelling ratios, as well as rapid volumetric changes in response to temperature changes through their LCSTs.

The high swelling ratios and rapid response times of the composite hydrogels make them useful as actuators in mechanical systems, such as in micromechanical systems, microelectromechanical systems, microfluidic devices and lab-on-a-chip devices. Because the composites have higher swelling ratios than their component polymer hydrogels, the volume of material needed to provide an operable actuator can be reduced relative to the volume of material that would be needed if the same polymer hydrogel, without the graphene flakes, was used.

The thermo-responsive hydrogel polymers of the composite hydrogels form a three-dimensional polymer network of crosslinked polymer chains that swell, without dissolving, when placed in contact with an aqueous medium and that undergo a reversible hydration-dehydration transition in response to a temperature increase. A variety of thermo-responsive hydrogel polymers can be used to make the composite hydrogels, provided they are able to react via functional groups with the graphene oxide to form a covalently bonded network. Such hydrogel polymers include those bearing pendant hydroxyl and/or amino groups. Poly(N-isopropylacrylamide) (PNIPAAm) is an example of a suitable thermo-responsive hydrogel polymer. The PNIPAAm can be a homopolymer or a copolymer comprising one or more additional polymerized co-monomers in addition to N-isopropylacrylamide. The co-monomers in a copolymer can be non-stimuli-responsive monomers—monomers that do not contribute to the hydration-dehydration transition in response to an external stimulus. Alternatively, the co-monomers can be stimuli-responsive monomers—monomers that contribute to the hydration-dehydration transition in response to an external stimulus, such as heat, pH, antigens and/or light. However, because it is desirable to have well-defined and well-controlled response characteristics for actuator applications, in some embodiments, the composite hydrogel are made from homopolymers or copolymers that do not comprise stimuli-responsive co-monomers.

The graphene oxide flakes of the composite hydrogels generally comprise only a single layer of graphene oxide. However, flakes comprising multiple graphene oxide sheets stacked via π-π stacking interactions may also be present in minor amounts. Typically, the number of multilayered graphene oxide flakes is sufficiently low that the average number of graphene oxide sheets in the graphene oxide flakes is close to one. For example the average number of graphene oxide sheets in the graphene oxide flakes can be no greater than about 3, no greater than about 2, no greater than about 1.5, or no greater than about 1.2. The graphene oxide sheets are oxidized layers of graphene that include epoxide, hydroxyl and/or carboxylic groups within the graphene structure. In order to facilitate covalent bonding between the graphene oxide and the hydrogel polymer, the graphene oxide sheets can be functionalized with reactive groups, such as (meth)acrylate groups, that undergo covalent bond-forming reactions with the polymer.

The graphene oxide flakes comprise, or consist-of, micro-scale, or sub-micron scale flakes, typically having sizes (i.e., largest diameters) of no greater than about 10 μm.

The composite hydrogels can be made by functionalizing the graphene oxide sheets in the graphene oxide flakes with one or more reactive functionalities and polymerizing the monomers of the thermo-responsive hydrogel polymer in the presence of the functionalized graphene oxide flakes to provide a crosslinked hydrogel polymer networks having graphene oxide flakes distributed in, and covalently bonded to, the polymer. By way of illustration, a reaction scheme for a method of synthesizing a composite hydrogel comprising glycidyl methacrylate-functionalized graphene oxide (GO-GMA) in a PNIPAAm hydrogel polymer is shown in FIG. 1. In this reaction scheme, graphene oxide having many carboxylic acid groups within its molecular structure is functionalized with methacrylate groups via esterification reactions with glycidyl methacrylate in the presence of 4-dimethylaminopyridine (DMAP) and N,N-dicyclohexyl-carbodiimide (DCC) in dimethyl sulfoxide (DMSO). The resulting GO-GMA is then dispersed in solution and NIPAAm is photopolymerized in the presence of the GO-GMA dispersion. A more detailed description of methods for making the composite hydrogels is provided in the examples presented below.

The concentration of graphene oxide flakes in the composite hydrogel can vary, depending upon the desired final response properties for the composite hydrogel. In some embodiments, the concentration of the graphene oxide flakes (including any functional groups attached thereto) in the composite hydrogel is in the range from about 0.1 to about 10 weight percent. This includes embodiments in which the concentration of the graphene oxide flakes (including any functional groups attached thereto) in the composite hydrogel is in the range from about 1 to about 10 weight percent of the composite hydrogel and also includes embodiments in which the concentration of the graphene oxide flakes (including any functional groups attached thereto) in the composite hydrogel is in the range from about 0.1 to about 0.5 weight percent of the composite hydrogel In some embodiments, the composite hydrogels are photopatternable. For example, composite hydrogels comprising GO-GMA flakes covalently bonded into a PNIPAAm polymer network can be photopatterned via ultraviolet (UV) radiation. As illustrated in the examples below, this property of the composite hydrogels renders them well-suited for use as actuators in micromechanical devices.

Figure 2:
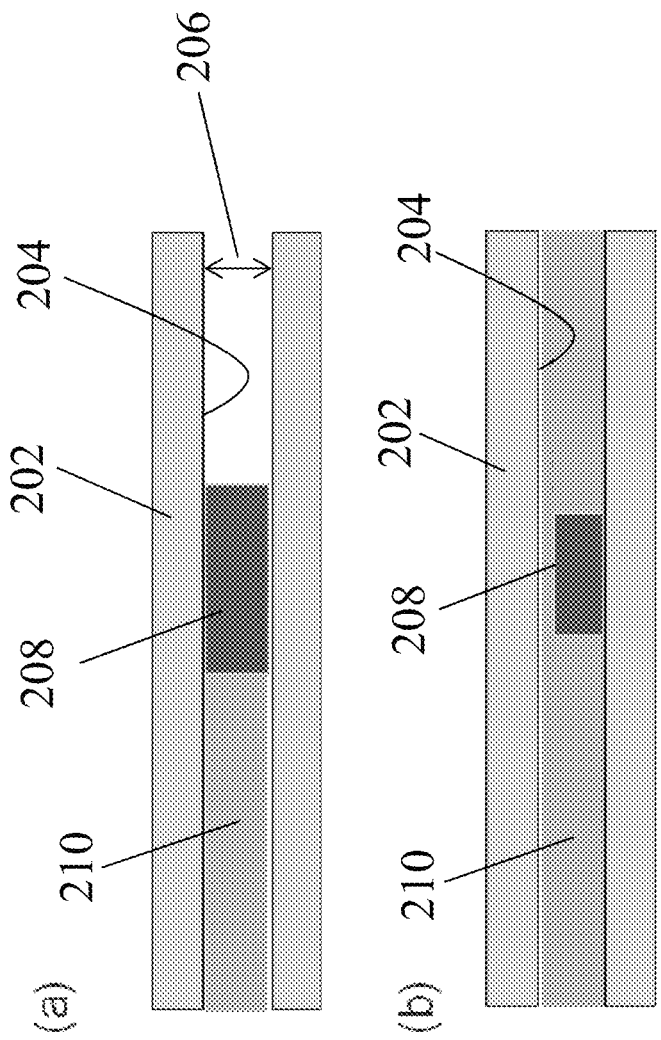
FIGS. 2(a) and (b) are schematic diagrams of a cross-section of a microfluidic channel having a microvalve fabricated from a composite hydrogel in a closed (a) and an open (b) position.

The composite hydrogels can be fabricated into a variety of actuators including, but not limited to, switches, valves and ring actuators. A schematic diagram of a cross-section of a microfluidic channel that includes a composite hydrogel fabricated into a value is provided in FIG. 2. The microfluidic channel 202 has an internal surface 204 that defines an internal diameter 206. A composite hydrogel 208 is affixed to the internal surface of the microfluidic channel. Initially, as shown in FIG. 2(a), under ambient conditions (i.e., at a first temperature) the composite hydrogel is swollen with water or an aqueous medium to a volume sufficient to block a fluid 210 from flowing through the microfluidic channel. As shown in FIG. 2(b), the valve is opened by heating the composite hydrogel to a second temperature that is sufficiently high to shrink the volume of the composite hydrogel and permit fluid to flow past the valve and through the microfluidic channel.

Figure 3A:
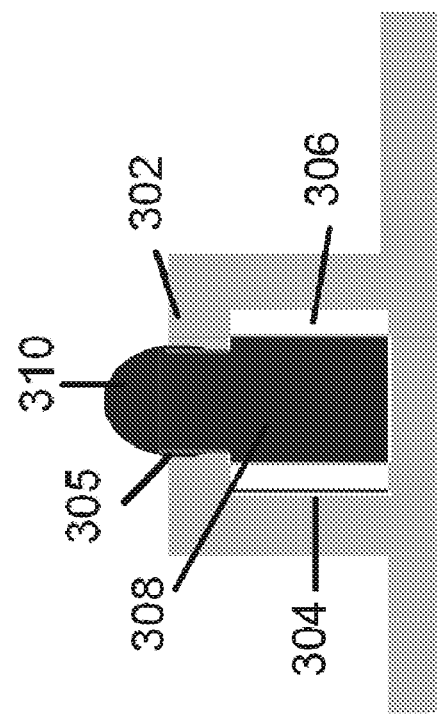
FIGS. 3(a) and (b) are schematic diagrams of a cross-section of a microlens with a ring actuator fabricated from a composite hydrogel in a large focal length (a) and short focal length (b) configuration.
Figure 3B:
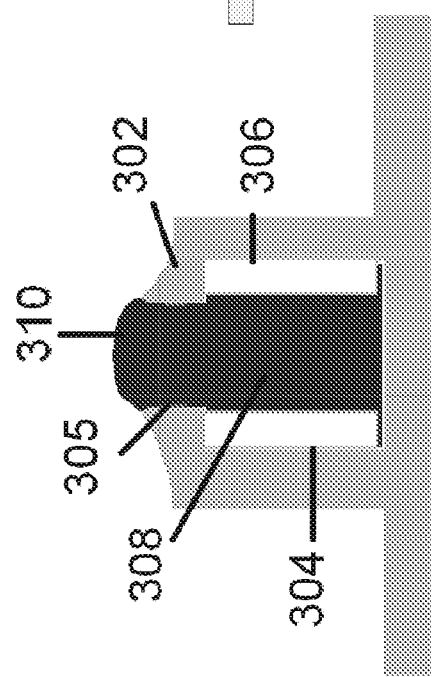

A schematic diagram of a tunable liquid microlens structure with a composite hydrogel ring actuator is provided in FIG. 3. The structure includes a cavity housing 302 having an internal surface 304 and a lens aperture 305. A ring of composite hydrogel 306 is disposed within the cavity housing against internal surface 304. The composite hydrogel ring defines an internal fluid cavity which is filled with a liquid 308, such as water, that forms a meniscus 310 in aperture 305 and acts as a lens. As shown in FIG. 3, as the temperature of the composite hydrogel is changed from first temperature (FIG. 3(a)) to a higher temperature (FIG. 3(b)), the volume of the composite hydrogel shrinks and the shape of the meniscus changes thereby reducing its focal length.

EXAMPLES

Example 1

This example illustrates the synthesis of an IR-responsive composite hydrogel based on thermo-responsive PNIPAAm incorporating GO-GMO and the use of the composite hydrogel as a remotely-activated microvalve.

Materials:

Graphite powder was obtained from Fisher Scientific. Isobornyl acrylate (IBA) was obtained from Surface Specialties UCB (Smyrna, Ga., USA). Potassium permanganate ($KMnO_4$), sodium nitrate ($NaNO_3$), 4-dimethylaminopyridine (DMAP), N—N-dicyclohexylcarbodiimide (DCC), glycidyl methacrylate (GMA) and 2,2-dimethoxy-2-phenylacetophenone (DMPA, 90%) were obtained from Sigma-Aldrich (St. Louis, Mo., USA). N-isopropylacrylamide (NIPAAm), N,N'-methylenebisacrylamide (NMBA; electrophoresis grade), and dimethyl sulfoxide (DMSO, 99.6+%) were obtained from Acros Organics (Morris Plains, N.J., USA). All regents were used as received.

Figure 4:
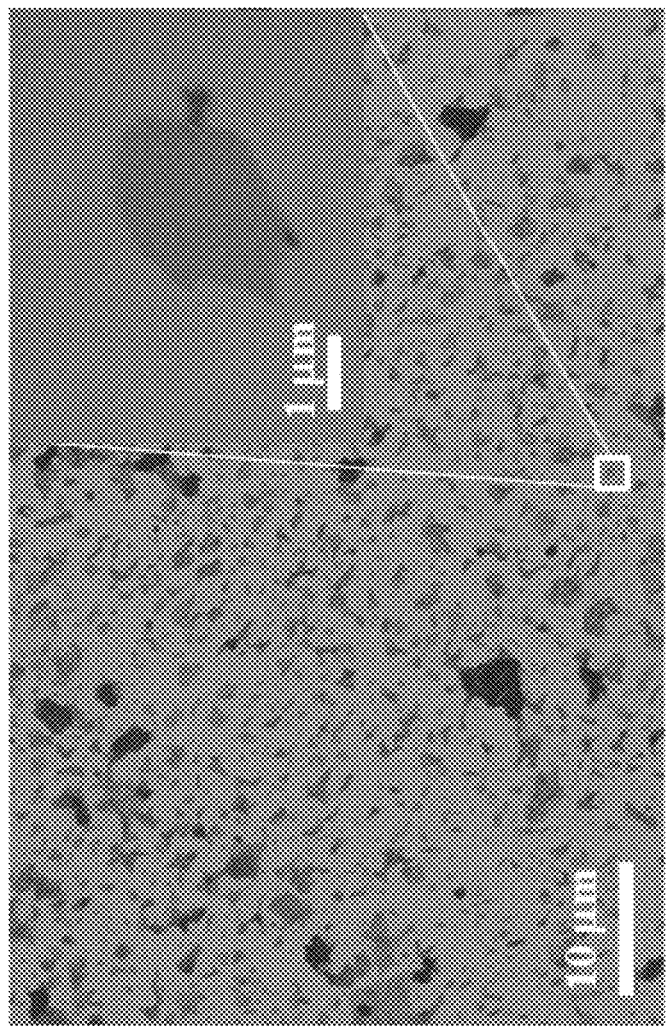
FIG. 4 shows an SEM image of graphene oxide (GO) flakes on a silicon substrate. The darkest (black) flakes correspond to those having several stacked GO sheets in the flake.

Graphene Oxide (GO) Synthesis:

GO flakes were prepared from natural graphite powder by a modified Hummers method, as described in W. S. Hummers and R. E. Offeman, *Journal of the American Chemical Society*, 1958, 80, 1339-1339. Graphite (5 g) and $NaNO_3$ (2.5 g) were mixed with a 95% sulfuric acid ($H_2SO_4$, 120 mL) in a 500 mL flask. The mixture was stirred for 30 min in an ice bath. Under vigorous stirring, 15 g of $KMnO_4$ was added to the suspension. The rate of addition was controlled to keep the reaction temperature lower than 20° C. The ice bath was then removed and the mixture was stirred at 35° C. overnight. As the reaction proceeded, the mixture gradually became pasty, and the color turned into light brown. Afterwards, 150 mL of deionized (DI) water was slowly added to the pasty mixture still under vigorous agitation. The reaction temperature was observed to rapidly increase to 98° C. with effervescence and the color changed to a brown-yellow color. The diluted suspension was then stirred for 1 day. Next, 50 mL of 30% hydrogen peroxide ($H_2O_2$) was added to the mixture. For purification, the mixture was washed with 5% hydrochloric acid (HCl) and then with DI water several times to obtain the graphite oxide sample. The exfoliation was carried out by sonication of the GO in aqueous solution for 40 mins. The as-produced GO flakes were observed under scanning electron microscopy (SEM). An SEM image of the flakes is shown in FIG. 4.

Synthesis of Glycidyl Methacrylate Functionalized GO (GO-GMA):

GO (0.5 g), DCC (1.85 g, 9 mmol) and DMAP (0.14 g, 1.2 mmol) were dissolved in dimethyl sulfoxide (DMSO, 60 ml) at room temperature. After dissolution of DMAP, GMA (0.5 g, 3.52 mmol) was added. The mixture was stirred at 45° C. for 24 hours under ambient conditions. To quench the reaction, an equimolar amount of HCl was added to the solution to neutralize DMAP. The neutralized GO-GMA was then precipitated with iso-propanol (IPA). The GO-GMA powder was further dispersed in DI water and reprecipitated out with IPA three times. The precipitates were obtained in a centrifuge at 2500 rpm for 30 mins. Centrifugation was performed with a Centra Biofuge Primo equipped with a rotor (Thermo Electron Corp., Model 854, Marietta, Ohio). The product was dried in vacuum at room temperature for 24 hours and redispersed in DMSO for further use. The GO-GMA stayed well dispersed without precipitation in DMSO for several weeks. The presence of pendant glycidyl methacrylate groups was confined by FT-IR spectroscopy.

Preparation of GO-GMA Composite Hydrogel Microactuators:

The GO-GMA composite hydrogel was prepared by liquid-phase photopolymerization of NIPAAm in the presence of the GO-GMA dispersed in DMSO solution. The GO flakes were covalently modified and crosslinked within hydrogel polymer network according to the reaction scheme shown in FIG. 1.

Figure 5:
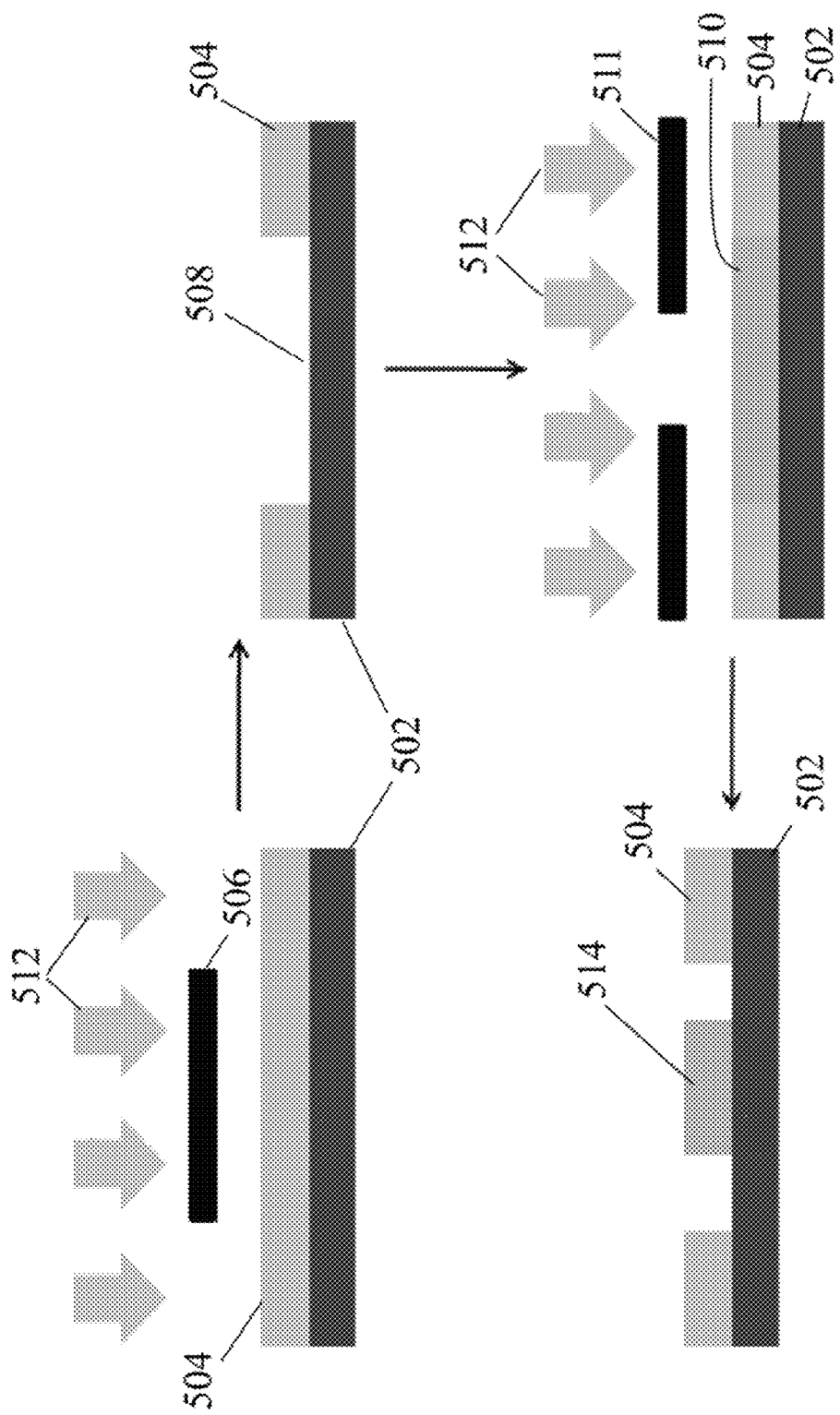
FIG. 5 is a schematic diagram showing a method for fabricating a microfluidic channel having a composite hydrogel valve.

FIG. 5 shows a schematic illustration of the fabrication of a GO-GMA composite hydrogel structure within a microfluidic channel. First, the microfluidic channel was defined. A polycarbonate cartridge cavity 502 (HybriWells, Grace Bio-Labs, Bend, Oreg.) was filled with isobornyl acrylate (IBA) prepolymer solution. The IBA 504 provided the structural material for the flow channel. The thickness of the cavity was defined by a 200-μm thick spacer. A film photomask 506 was aligned over the IBA followed by irradiation with ultraviolet (UV) radiation (intensity, I=9 mW/cm², time, t=20 s). The IBA was photopolymerised in this step and thus formed the microfluidic channel 508. Afterwards, another glass slide (not shown) was placed onto the IBA channel structure. A pregel solution was prepared by mixing NIPAAm, NMBA, GO-GMA DMSO solution, water and DMPA in the weight ratio of 2.18:0.124:3.0:1.0:0.154. The concentration of GO-GMA in DMSO solution was 50 mg/ml which made the GO-GMA 2.3 wt. % of the overall composite hydrogel. This GO-GMA pregel solution 510 was then injected into the channel and was subsequently photopatterned using a second mask 511 under UV light 512 (intensity I=28 mW/cm$^2$; time t=25 s). Non-crosslinked gel precursor was then flushed away using DI water. The result was a rectangular GO-GMA composite hydrogel structure 514 formed in the microchannel.

Characterization:

The presence of pendant glycidyl methacrylate groups in GO-GMA was confirmed by the FT-IR spectra (Bruker Equinox 55 FTIR with diamond ATR accessory, Billerica, Mass.). A strong volumetric change of the GO-GMA hydrogel when exposed to IR light was observed. A charge coupled device (CCD)-coupled stereoscope was placed above a piece of the composite hydrogel film submerged in DI water to monitor and record the images of the film when it underwent volumetric change. An IR light source (Hotspot, Model H. S. 250.3, I$^2$R, Cheltenham, Pa.) irradiated the sample from the side at an oblique angle and the power intensity at the plate of the IR-responsive composite hydrogel was measured by a power meter (Field Max II, Coherent Inc., Santa Clara, Calif.) to be 1.21 W/cm$^2$.

The photothermal conversion efficiency of GO-GMA was measured by irradiating GO-GMA in DMSO, pure DMSO, and pure DI water with IR light at a power intensity of 1.2 W/cm$^2$ and an exposure area of 2 cm$^2$ for 2 mins. The temperature was recorded using a thermocouple every 5 seconds.

The swelling ratios of the GO-GMA composite hydrogel and conventional PNIPAAm hydrogels, for comparison, were measured gravimetrically in a controlled temperature range of 10-50° C. in water bath. The conventional NIPAAm hydrogel prepolymer mixture consisted of NIPAAm, NMBA, DMSO, DI water and DMPA in the weight ratio of 2.18:0.124:3.0:1.0:0.154. The prepolymer was polymerized via photopolymerization under the same conditions as the GO-GMA composite hydrogel. The composite hydrogels were incubated in DI water for at least 24 h at room temperature and the weight of the gel was recorded at 5° C. intervals after blotting the excess surface water with moistened Whatman #1 filter paper. The swelling ratio ($S_r$) was calculated via Eq. (1). The swelling ratio was measured after the gel was incubated at each new temperature in DI water for 1 hour to reach equilibrium. The measurements were carried out as the temperature was raised.

Figure 6:
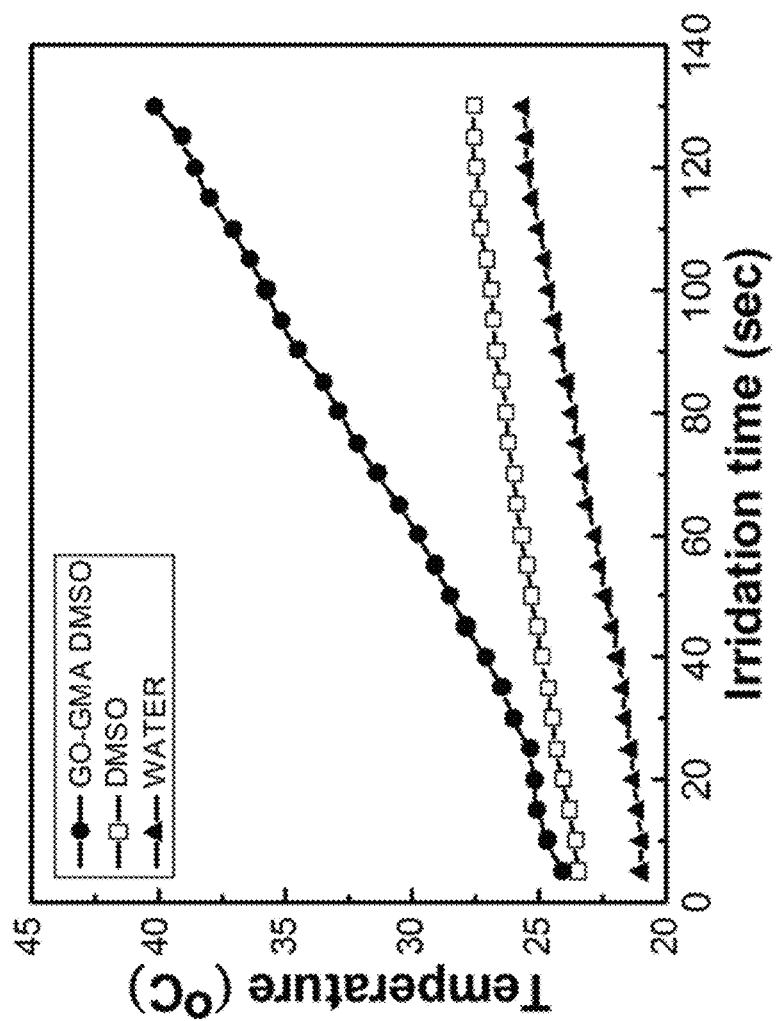
FIG. 6 is a graph showing the thermal response of glycidyl methacrylate-functionalized graphene oxide (GO-GMA) flakes in a DMSO solution under IR light as a function of time.

Results:

GO is capable of converting photo energy into thermal energy efficiently. The temperature changes caused by the photothermal conversion of GO-GMA in DMSO solution are shown in FIG. 6. The comparison with the temperature response of pure water and DMSO under identical IR light irradiation conditions demonstrated the high performance of GO-GMA for photothermal energy conversion. The pure water and DMSO solution did not induce a significant temperature change in DMSO solution upon irradiation of IR light for 2 mins. However, the temperature of the GO-GMA DMSO solution rose from room temperature (about 23° C.) to 41° C. within 2 mins under the same irradiation condition. Using the molar heat capacity of DMSO (153.27 J/mol ° K), the amount of heat transfer to 2 mL of DMSO causing 16.1° C. of temperature change can be estimated to be 63.27 J. With the irradiation power of 1.2 W/cm$^2$ over 2 cm$^2$ of exposure area. The overall efficiency of the photothermal conversion process in DMSO solution is estimated to be 22%. The high efficiency of heat transfer to DMSO solution can be attributed to the extremely high value of thermal conductivity of graphene which has been reported to be up to 5300 W/mK at the room temperature (See A. A. Balandin, S. Ghosh, W. Bao, I. Calizo, D. Teweldebrhan, F. Miao and C. N. Lau, *Nano Letters*, 2008, 8, 902-907 and W. Yu, H. Q. Xie and W. Chen, *Journal of Applied Physics*, 2010, 107, 094317.) The superb thermal conduction of GO is beneficial to the IR light responsive composite hydrogels because faster heat conduction facilitates a faster response from the composite hydrogels.

Figure 7:
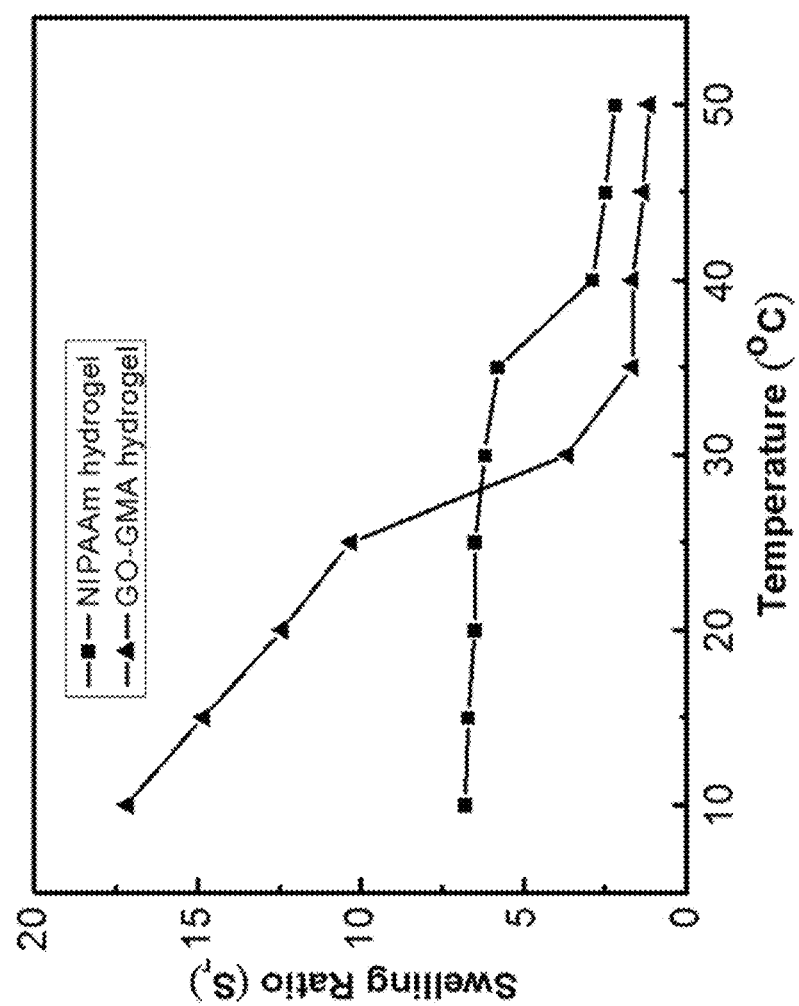
FIG. 7 is a graph showing the swelling ratio as a function of temperature for a GO-GMA composite hydrogel and for a PNIPAAm hydrogel that does not include GO flakes.

FIG. 7 shows the equilibrium swelling ratio ($S_r$) for the composite hydrogel and the PNIPAAm hydrogel polymer in the absence of the GO flakes. This illustrates the LCST and water absorbing behavior of the composite hydrogel and conventional PNIPAAm hydrogels. These results show that introduction of GO flakes can dramatically increase the swelling ratio below the LCST by approximately 3 fold; lower the phase transition temperature by 10° C.; and render the volume collapse more gradual within a broader temperature range compared to the conventional PNIPAAm hydrogel.

When exposed to IR light, the composite hydrogel underwent significant volumetric change. The incorporated GO-GMA sheets within the hydrogel polymer network absorb the IR radiation and convert the energy into heat which heats up the local vicinity of the hydrogel polymer network. The heat raises the temperature above the LCST and triggers the hydrophilic-hydrophobic transition in the hydrogel polymer. Thus, the hydrophobic interactions among the hydrophobic groups become relatively stronger above the LCST. This induces the release of the entrapped water molecules from the polymer network until the hydrophobic interactions become fully dominant. With a rapid water release, the polymer chains collapse abruptly and the phase separation of the hydrogel polymer network system occurs.

From the time of 1 s, IR light was turned on and the rectangle-shaped GO-GMA composite hydrogel film started to shrink in all directions. At 75s, the GO-GMA composite hydrogel shrunk to its minimum size and remained unchanged after that. This result further confirms the photothermal conversion through GO-GMA sheets within the hydrogel network can trigger the hydrophobic-hydrophilic transition effectively.

Figure 8:
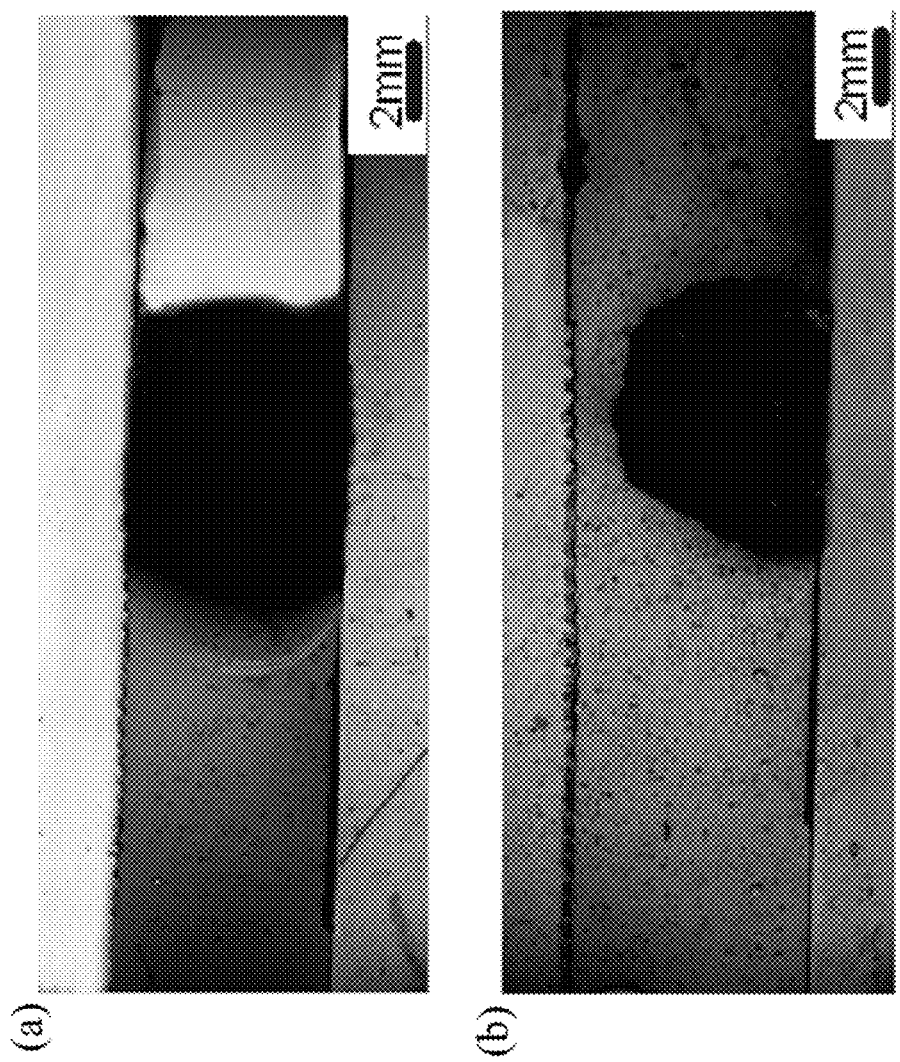
FIGS. 8(a) and (b) are SEM images of a microvalve made from a GO-GMA composite hydrogel in a microfluidic channel in a closed (a) and open (b) position.

Images of the microvalve based on the composite hydrogel in a microfluidic channel are shown in FIGS. 8(a) and (b). Initially in its OFF state, with the IR light turned off, the GO-GMA hydrogel microvalve completely blocked the fluidic flow in the microfluidic channel. This is illustrated in FIGS. 2(a) and 8(a). When the IR light was turned on, the GO-GMA flakes absorbed IR light, triggering the composite hydrogel to contract to allow for fluidic flow, thereby creating the ON state, as shown in FIGS. 2(b) and 8(b). As the IR light was turned off, the heat dissipated to the surrounding environment and the composite hydrogel absorbed water and expanded back to its original volume, preventing fluidic flow through the microchannel (OFF state again).

The improved response performance of the GO-GMA composite hydrogel can be attributed to the rapid transition from hydrophilicity to hydrophobicity of the PNIPAAm hydrogel polymer. The hydrophilic groups in the side chains of the PNIPAAm hydrogel polymer interact with water molecules through hydrogen bonds. There are also numerous C—OH and C—O—C groups on the GO-GMA sheets, either on the edges or the planes, which can serve as hydrogen bonding sites and provide extra hydrogen bonding with water molecules. These extra hydrogen bonds act cooperatively to form a stable hydration shell around the hydrophobic groups, which can lead to a greater volumetric change of the GO- GMA composite hydrogel as compared to PNIPAAm hydrogel without GO incorporation.

Example 2

This example illustrates the fabrication of a thermo-responsive composite hydrogel-actuated microlens array. The composite hydrogel comprises glycidyl methacrylate (GMA) functionalized graphene-oxide (GO) flakes incorporated into thermo-responsive poly(N-isopropylacrylamide) (PNIPAAm) hydrogel polymer. The composite hydrogel was made according the methods described in Example 1. This GO-GMA composite hydrogel has much faster thermal response compared to the original PNIPAAm hydrogel polymer in the absence of the GO-GMA flakes, and provides more effective actuation for focal length tuning. In addition, the delivery and dissipation of heat to the composite hydrogel actuator is much enhanced compared to that of the original PNIPPAm hydrogel without the GO-GMA flakes. The microlens array was fabricated on a curvilinear surface (a hemispherical shell) to achieve large field of view, utilizing a relatively simple process. In the microlens array, thermoelectric modules were assembled close to the hydrogel actuators to facilitate the local cooling process. These modules also improved the local heating process of the composite hydrogel.

Figure 9:
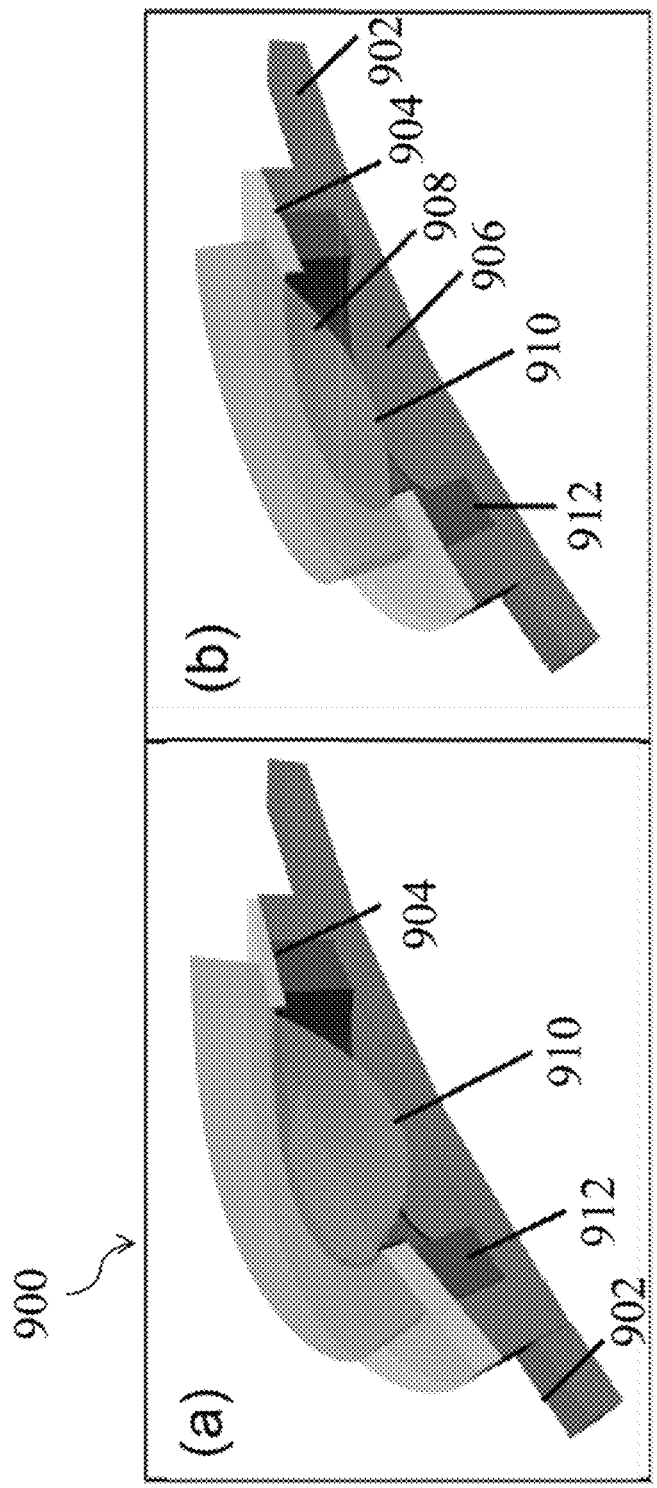
FIGS. 9(a) and (b) are schematic diagrams showing a microlens having a ring actuator made from a GO-GMA composite hydrogel in a short focal length (a) and long focal length (b) configuration.
Figure 10:
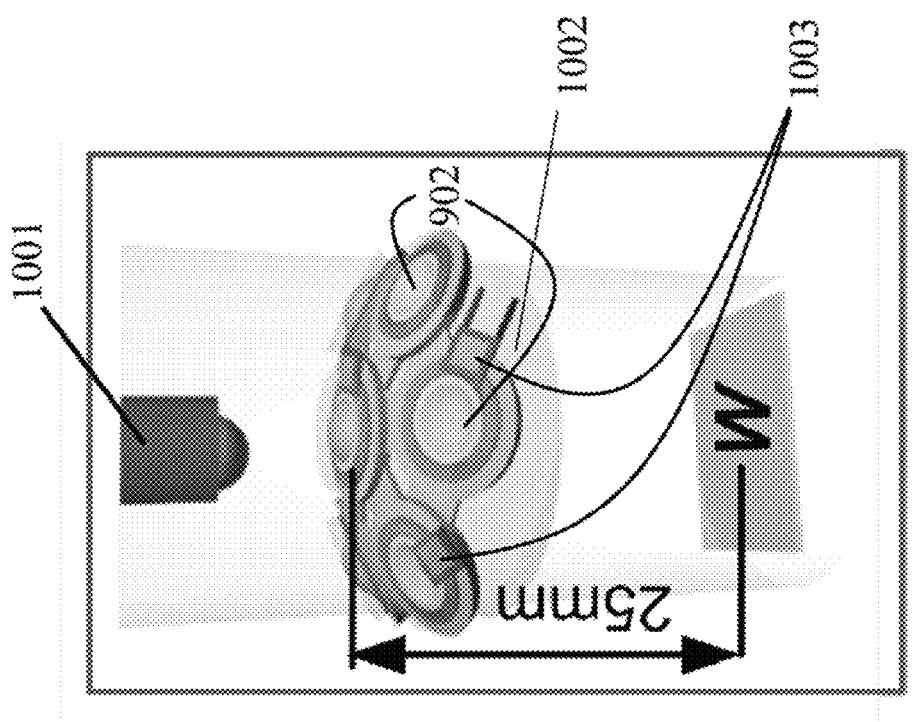
FIG. 10 is a schematic diagram showing an array of microlenses of the type shown in FIGS. 9(a) and (b) arranged on a hemispherical substrate.

FIGS. 9(a) and (b) show three-dimensional schematic diagrams of one GO-GMA composite hydrogel-driven liquid microlenses 900 in an array fabricated on a hemispherical shell. A cavity, defined by a polydimethylsiloxane (PDMS) polymer substrate 902 and a PDMS aperture slip 904, is filled with water 906. Silicone oil 908 is added onto the water to prevent evaporation and serve as the lens material due to its higher refractive index (1.48) compared to that of water (1.33). The sidewall of the aperture slip is treated such that it is hydrophilic, while the top surface of the PDMS slip is naturally hydrophobic. Thus, a water-oil meniscus 910, whose circumference is pinned by a hydrophobic-hydrophilic (H—H) boundary at the top edge of the aperture, functions as a microlens. Several GO-GMA composite hydrogel sectors are photopatterned in the cavity, acting as the actuators 912 to tune the focal lengths of the microlenses. As the temperature decreases, the composite hydrogel expands and tilts the aperture slip upward, which presses the water-oil interface downward, as illustrated in FIG. 9(b), thus shortening the focal length. When the temperature increases, the composite hydrogel shrinks and tilts the aperture slip downward, resulting in an increase in focal length, as illustrated in FIG. 9(a). To provide local heating and cooling of the composite hydrogel, several thermoelectric modules (TE-8-0.45-1.3 and TE-35-0.6-1, TE Technology, Inc., Traverse City, Mich.) are assembled around the microlenses. A six-element microlens array fabricated on a hemispherical shell is shown in FIG. 10.

The GO-GMA composite hydrogel microlens array was fabricated using soft lithography. Two PDMS layers, whose patterns were transferred from polymer molds, were bonded together to form the cavity structure. GO-GMA composite hydrogel sectors were subsequently photopatterened into the cavity as actuators. The sidewalls of the aperture slip were treated hydrophilic to pin the water-oil menisci. Next, the structure was formed onto a hemispheric acrylate shell (diameter: 18 mm). Finally, each cavity was filled with water which was covered by silicone oil, forming a microlens from the water-oil interface. Descriptions of the detailed fabrication procedures for microarray lenses with the geometry shown in FIGS. 9(a) and (b) can be found in D. Zhu, C. Li, X. Zeng, and H. Jiang, "Tunable-focus microlens arrays on curved surfaces," Appl. Phys. Lett., vol. 96, no. 8, pp. 081111-3 (2010) and D. Zhu, X. Zeng, C. Li and H. Jiang, "Focus-tunable microlens arrays fabricated on spherical surfaces," J. Microelectromech. Syst., vol. 20, no. 2, pp. 389-395 (2011).

Figure 11:
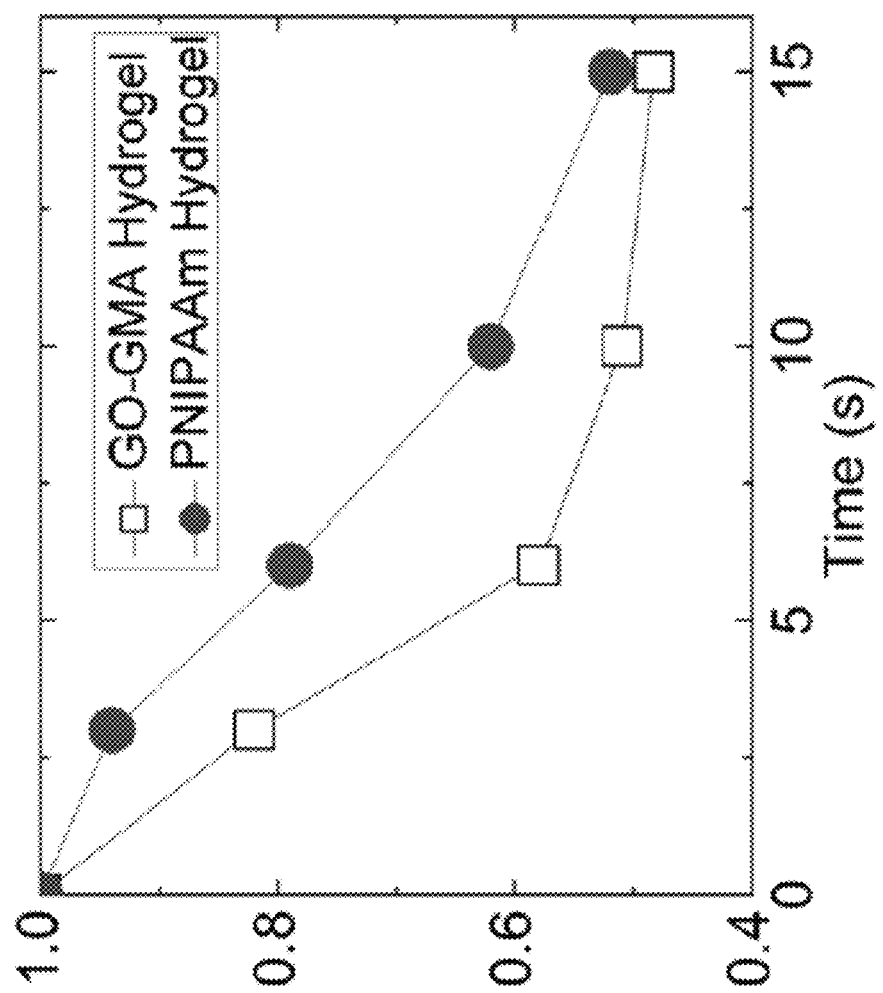
FIG. 11 is a graph showing the volume changes for a GO-GMA composite hydrogel and a PNIPAAm hydrogel in the absence of the GO flakes under thermal variance.

The GO-GMA composite hydrogel provides the microlenses with fast response characteristics. With their high efficiency in thermal absorption and conduction, the GO flakes incorporated into the PNIPAAm hydrogel polymer significantly enhance the hydration-dehydration transition, thus increasing the tuning speed. A comparison of the volume changes for the GO-GMA composite hydrogel and the PNIPAAm hydrogel in the absence of the GO flakes under thermal variance is shown in FIG. 11. To obtain this comparison, a GO-GMA composite hydrogel film and a PNIPAAm hydrogel film with the same initial diameter of 10 mm were immersed in water. Then, the hydrogel films were heated at 65° C. on a hot plate for 6 s. A much more distinct change in area of the GO-GMA hydrogel film was observed as compared to the PNIPAAm hydrogel film. The dynamic change in the normalized areas of both films is plotted in FIG. 11. Heating at 65° C. started at 0 s. The GO-GMA hydrogel composite contracted much faster than PNIPAAm and the difference in areas reached the maximum at around 5 s. As indicated in this experiment, microlenses with GO-GMA composite hydrogel actuators have faster tuning speed than those with PNIPAAm hydrogel actuators.

The thermoelectric modules improved the response time of lenses. Finite element method (ANSYS; ANSYS, Inc., Canonsburg, Pa.) was employed to quantitatively analyze the heat conduction in the microlens array structure that included the thermoelectric modules. A model of the six-element microlens array structure was first established in ANSYS. Thermal transient analysis was then performed. Tuning from short focal length to long focal length (forward cycle) and from long focal length to short focal length (reverse cycle) were simulated. The thermal boundary condition was set as 65° C. in the forward cycle and 15° C. in the reverse cycle at the bottom of the polymer substrate to simulate the function of the thermoelectric module. Steady temperature profiles of the microlens array in the forward and reverse cycles were obtained by monitoring one point in the inner circular wall where the hydrogel actuator resides. In the forward cycle, the point was heated to 51° C. within 0.3 s. Similarly, in the reverse cycle, the temperature at this point decreased below 20° C. within 0.1 s. The simulation results confirm that thermoelectric modules can rapidly increase or decrease the temperature near the composite hydrogel actuators.

Focal length measurements and imaging characterization of the GO-GMA composite hydrogel-driven liquid microlenses were then performed. First, the microlens under test was set at the shortest focal length (0 s). Then, the thermoelectric module operated as a heater to contract the hydrogel composite for 5 s (forward cycle). Subsequently (at 5 s), the thermoelectric module was reverse connected to perform as a cooler to expand the hydrogel composite (reverse cycle). The focal length of the microlens gradually decreased over a period of 11 s.

The focal length of each microlens in the array was measured for one scanning cycle. The focal lengths varied from several millimeters to more than one hundred millimeters. The nonuniformity stemmed from the different volumes of water initially added into the individual cavities, as well as the nonuniformity in the exposure system for fabrication. The setup to test the imaging of the GO-GMA composite hydrogel-driven tunable-focus microlens array on the hemispherical shell is shown in FIG. 10. An object plane with a logo of "W" (1 mm in size) was positioned 25 mm below the microlens array (including the underlying hemispherical shell 1002). A CCD-coupled stereoscope 1001 was positioned above the microlens array to monitor and capture images obtained from the microlenses. The images were magnified before 5 s when the thermoelectric modules 1003 functioned as a heater, indicating an increase in focal length; the image scaled back after 5 s when thermoelectric modules 1003 functioned as a cooler, indicating a decrease in focal length.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A composite hydrogel comprising graphene oxide flakes distributed in and covalently bonded to a thermo-responsive hydrogel polymer, wherein the swelling ratio for the composite hydrogel is at least 50% greater than the swelling ratio for the thermo-responsive hydrogel polymer in the absence of the graphene oxide flakes at a temperature below the lowest critical solution temperature of the composite hydrogel.

2. The composite hydrogel of claim 1, wherein the temperature below the lowest critical solution temperature of the composite hydrogel is 10° C.

3. The composite hydrogel of claim 1, wherein the thermo-responsive hydrogel polymer comprises polyisopropylacrylamide.

4. A composite hydrogel comprising graphene oxide flakes distributed in and covalently bonded to a thermo-responsive hydrogel polymer, wherein the swelling ratio for the composite hydrogel is at least 50% greater than the swelling ratio for the thermo-responsive hydrogel polymer in the absence of the graphene oxide flakes at a temperature below the lowest critical solution temperature of the composite hydrogel, wherein the thermo-responsive hydrogel polymer comprises polyisopropylacrylamide, the polyisopropylacrylamide polymer comprising acrylamide functionalities, and wherein the covalent bonds between the graphene oxide and the polyisopropylacrylamide polymer are formed by reactions between the acrylamide functionalities and methacrylate functionalities on the graphene oxide.

5. The composite hydrogel of claim 3, comprising from about 0.1 and about 10 weight percent graphene oxide flakes.

6. The composite hydrogel of claim 5, wherein the average number of graphene oxide sheets in the graphene oxide flakes is no greater than about 2.

7. The composite hydrogel of claim 3, wherein the swelling ratio for the composite hydrogel is at least 100% greater than the swelling ratio for the thermo-responsive hydrogel polymer in the absence of the graphene oxide flakes at a temperature of 10° C.

8. The composite hydrogel of claim 1, wherein the composite hydrogel is photopatternable with ultraviolet light.

9. The composite hydrogel of claim 3, wherein the polyisopropylacrylamide is not polymerized from stimuli-responsive monomers other than N-isopropylacrylamide.

10. A composite hydrogel comprising graphene oxide flakes distributed in and covalently bonded to a thermo-responsive hydrogel polymer, wherein the swelling ratio for the composite hydrogel is at least 50% greater than the swelling ratio for the thermo-responsive hydrogel polymer in the absence of the graphene oxide flakes at a temperature below the lowest critical solution temperature of the composite hydrogel, wherein the thermo-responsive hydrogel polymer comprises polyisopropylacrylamide and wherein the polyisopropylacrylamide is an N-isopropylacrylamide homopolymer.

11. A microfluidic device comprising:
a flow channel having an internal surface that defines an internal diameter of the flow channel; and
a valve comprising the composite hydrogel of claim 1 affixed to the internal surface of the flow channel, wherein, in a swollen state, the composite hydrogel has a volume sufficient to block fluid flow through the flow channel.

12. A method of using the microfluidic device of claim 11, the method comprising heating the composite hydrogel in the swollen state to a temperature sufficient to shrink the volume of the swollen composite hydrogel and permit fluid flow though the flow channel.

13. The method of claim 12, wherein heating the swollen composite hydrogel comprises irradiating the swollen composite hydrogel with infrared radiation.

14. The method of claim 12, further comprising allowing the composite hydrogel to cool and re-swell to a volume sufficient to block fluid flow through the flow channel.

15. A lens structure comprising:
a fluid cavity;
a fluid housed within the fluid cavity, the fluid forming a meniscus configured to act as a lens; and
a ring actuator comprising the composite hydrogel of claim 1 disposed around the fluid, wherein, when the composite hydrogel is in a swollen state the lens has a first focal length and when the composite hydrogel is in an unswollen state the lens has a second focal length that differs from the first focal length.

16. A method of using the lens structure of claim 15, the method comprising heating the composite hydrogel in the swollen state to a temperature sufficient to shrink the volume of the swollen composite hydrogel, thereby changing the focal length of the lens.

17. The method of claim 16, wherein heating the swollen composite hydrogel comprises irradiating the swollen composite hydrogel with infrared radiation.

18. The method of claim 16, further comprising allowing the composite hydrogel to cool and re-swell.

19. The composite hydrogel of claim 4, wherein the acrylamide functionalities are formed by reactions between bisacrylamide crosslinkers and N-isopropylacrylamide monomers.

* * * * *